(12) United States Patent
Zhuber-Okrog

(10) Patent No.: US 8,094,369 B2
(45) Date of Patent: Jan. 10, 2012

(54) REGULATABLE OPTICAL AMPLIFIER, AND METHOD FOR REGULATING AN OPTICAL AMPLIFIER

(75) Inventor: Kuno Zhuber-Okrog, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 802 days.

(21) Appl. No.: 12/097,498

(22) PCT Filed: Oct. 25, 2006

(86) PCT No.: PCT/EP2006/067764
§ 371 (c)(1),
(2), (4) Date: Jul. 10, 2008

(87) PCT Pub. No.: WO2007/071477
PCT Pub. Date: Jun. 28, 2007

(65) Prior Publication Data
US 2010/0157415 A1    Jun. 24, 2010

(30) Foreign Application Priority Data
Dec. 15, 2005  (DE) ......................... 10 2005 060 019

(51) Int. Cl.
*H01S 3/00* (2006.01)
(52) U.S. Cl. .............. 359/337.1; 359/337.4; 359/341.41
(58) Field of Classification Search ............... 359/337.1, 359/337.4, 341.41
See application file for complete search history.

(56) References Cited

U.S. PATENT DOCUMENTS

| 6,441,950 | B1 | 8/2002 | Chen et al. | |
| 7,924,499 | B2* | 4/2011 | Inagaki et al. | 359/337.4 |
| 2003/0231379 | A1* | 12/2003 | Komaki et al. | 359/337.4 |
| 2009/0086310 | A1* | 4/2009 | Sugaya et al. | 359/337.1 |

FOREIGN PATENT DOCUMENTS

| EP | 1220382 | 7/2002 |
| EP | 1467506 | 10/2004 |
| EP | 1528698 | 5/2005 |

* cited by examiner

*Primary Examiner* — Mark Hellner
(74) *Attorney, Agent, or Firm* — Laurence A. Greenberg; Werner H. Stemer; Ralph E. Locher

(57) ABSTRACT

The invention relates to a regulatable optical amplifier which has at least two series-connected amplifier groups, each amplifier group having a regulating device. Connected upstream of the optical amplifier is a power monitor device for detecting changes in the input power, whose electrical output is connected both to the first regulating device and to the second regulating device. In line with the invention, the first and second regulating devices have a control line inserted between them which comprises a series circuit containing a high-pass filter, a delay and signal-shaping unit and a feed-forward control unit for generating a correction signal for the second regulating device. In this arrangement, the high-pass filter has a cut-off frequency which corresponds approximately to the cut-off frequency of the first amplifier group. The inventive control line optimizes the regulating response such that power transients in the output signal from the optical amplifier are reduced particularly after an abrupt change in the input power.

11 Claims, 3 Drawing Sheets

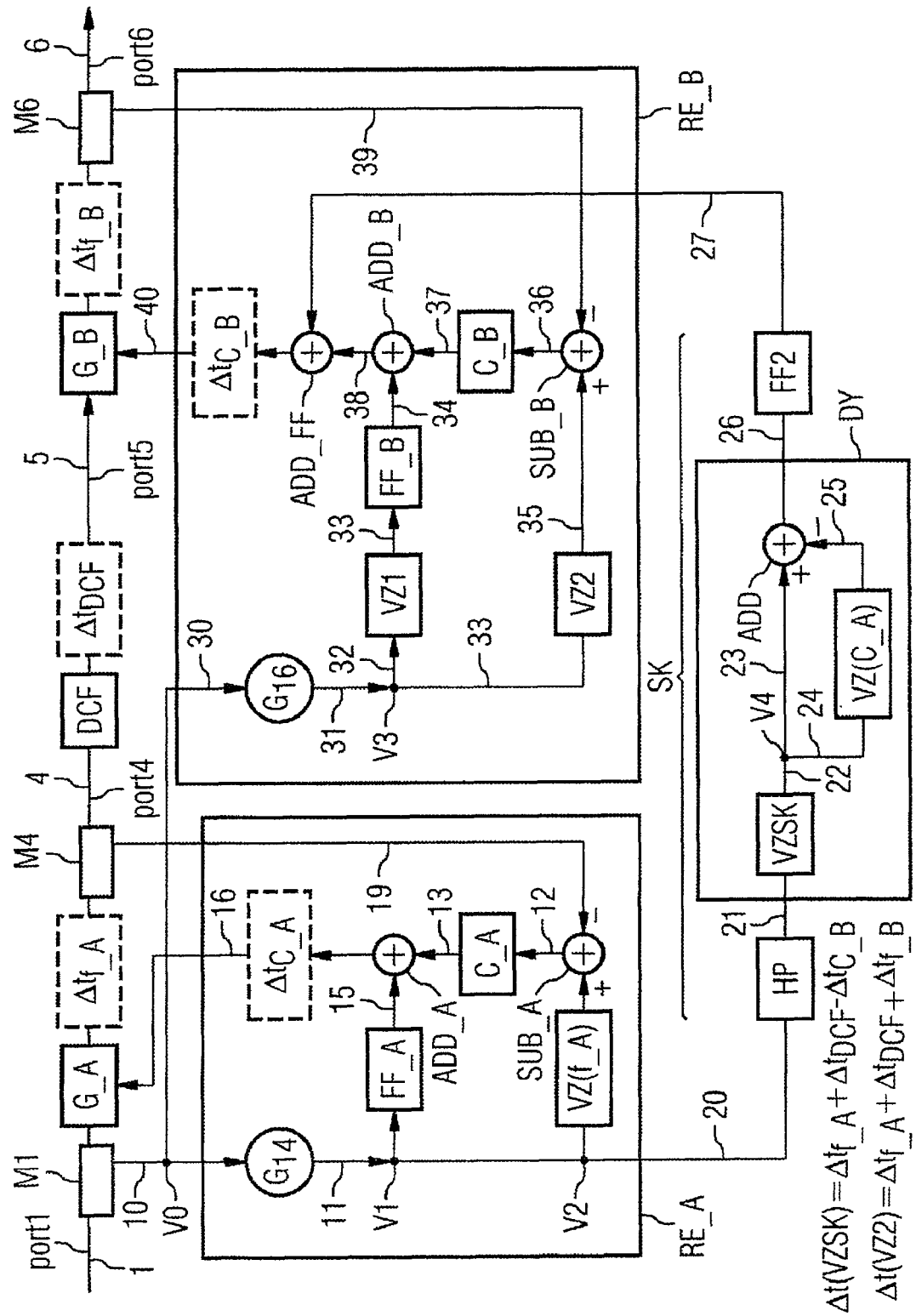

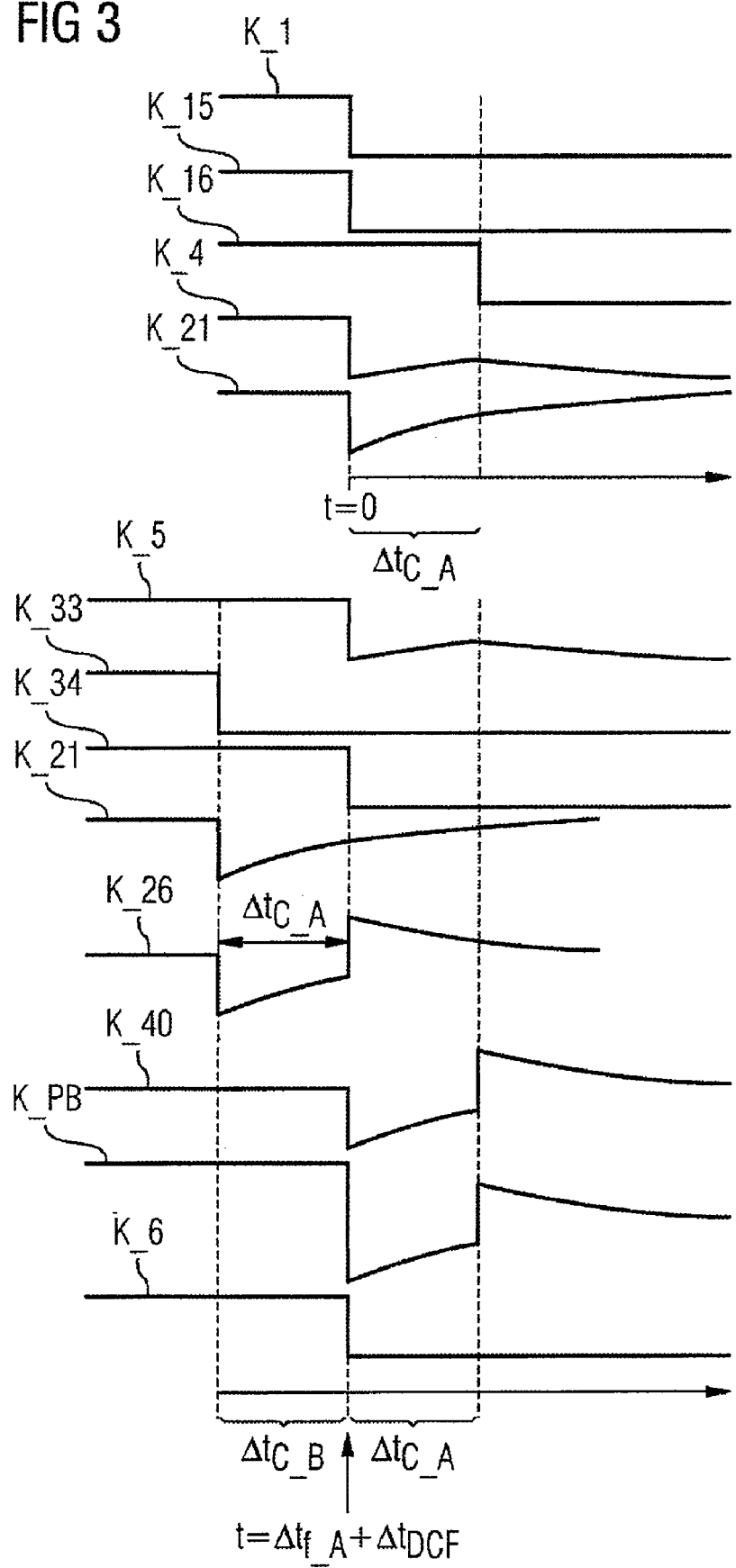

REGULATABLE OPTICAL AMPLIFIER, AND METHOD FOR REGULATING AN OPTICAL AMPLIFIER

TECHNICAL FIELD OF THE INVENTION

The invention relates to a regulatable optical amplifier, and a method for regulating an optical amplifier.

BACKGROUND OF THE INVENTION

In optical transport networks having a high range, optical fiber amplifiers whose amplifying fibers are doped with ions of an element originating from the group of rare earths are usually used for signal amplification. Fiber amplifiers doped with erbium ions ("erbium doped fiber amplifiers", abbreviated to EDFAs) are predominantly used commercially. Such an EDFA has, besides the input for the data signal, an optical pump source, e.g. a laser diode, the output signal of which is coupled into the fiber doped with erbium ions. The optical data signal guided in the doped fiber is amplified by stimulated emission of photons. The EDFAs generally comprise a plurality of amplifier stages. Hereinafter, amplifier stage denotes in each case that part of an EDFA which contains precisely one continuous erbium doped fiber arranged between passive components. Hereinafter, amplifiers which are split into a plurality of amplifier groups are considered, where an amplifier group can comprise either a single amplifier stage or a plurality of amplifier stages.

In order to exhaust the capacity of optical transmission fibers, the data signals are transmitted in individual transmission channels that are often combined by means of the technique of wavelength division multiplexing (abbreviated to WDM). Transmission of WDM signals with up to 80 channels at data rates of up to 40 Gbit/s is possible nowadays by means of the WDM technique. The number of channels varies depending on capacity utilization and transport volume of the transmission system. If channels are switched in and out in the transmission system or coupled in and out at branching points, then this gives rise to abrupt changes in the aggregate signal power in the transmission system. Said changes can lead to bit errors and also to damage at the optical receivers because the latter can operate without any errors only for a limited input power range.

If such abrupt changes in the signal power are present at the input of an optical amplifier, then the pump power of the amplifier has to be adapted rapidly to these power fluctuations of the input signal in order to avoid large jumps in the powers of the channels that are not involved in the switching operation. The output power of an optical amplifier depends on the gain thereof. The amplifier gain is determined by the pump wavelength and pump power in addition to material parameters. Furthermore, the amplifier gain is determined by the input power upon reaching the maximum possible output power (saturation). If the gain remains constant, the power of the channels which are not involved in the switching operation does not change since they are always amplified to the same extent. Therefore, in the design of an optical fiber amplifier, it is always of importance to obtain an amplifier gain that is as constant as possible even in the event of large power jumps at the amplifier input. This is achieved by means of gain regulations. The latter are usually output power regulations in conjunction with an amplified signal, derived from the input signal, as desired value. Methods for regulating the amplifier gain or the amplifier output power are known in many cases from the prior art. Regulating devices supplemented by a control, a so-called feedforward control, are normally used. In the regulating circuit and the feedforward control chain, the optical pump forms the actuating element and the pump power accordingly corresponds to the manipulated variable.

Signal delays are unavoidable in the overall arrangements of optical amplifiers. During signal amplification, in EDFAs in particular, delays of the optical signal occur just as a result of the propagation time in the optical fiber. Said delays amount to approximately 0.3 to 0.6 µs. Furthermore, delays also arise as a result of the physical operation of amplification. When a pump source of 980 nm is used, the electrons of the doping element erbium, during the pumping operation, are initially raised to a first, higher atomic energy level, from which they first relax in a non-radioactive transition to a metastable intermediate level before falling back to the atomic ground level with emission of photons. In addition to these delays of the optical signal, delays of the electrical signal also occur within the regulating device due to the individual structural elements thereof. These include for example delays during the detection and optoelectrical conversion of the input and output signals, delays at the actuators of the pump device and during the signal processing, which can be effected in analog or digital fashion. All these factors adversely influence the regulating behavior, that is to say that the dynamic properties of the regulating device do not lead to an optimum system response. Thus, during the transition recovery time of the regulating device, undesirable transients occur in the amplifier gain, which are manifested in the form of overshoots or undershoots in the output power of the amplifier and in undesirable gain changes.

If a plurality of single-stage amplifiers are cascade-connected in order to obtain higher ranges, then an amplifier cascade arises. Overshoots and undershoots in the output power of the amplifier can accumulate in this case. Small deviations in the gain of individual amplifiers lead to large deviations in the gain at the output of the amplifier cascade. In addition, the abovementioned optical and electrical signal delays make it more difficult to exactly regulate the amplifier gain at the output of the amplifier cascade. Considerable delays of the optical signal of an order of magnitude of 100 µs occur due to the signal propagation time if dispersion compensating fibers (abbreviated to DCFs) are connected between individual amplifier stages.

An earlier German patent application bearing the application number 10 2004 052 883.7 discloses a solution for the compensation of gain fluctuations of a multistage optical amplifier. In the event of a power jump in the input power, the pump power of the first amplifier stage is adapted, the change in the input power that is to be expected at a downstream second amplifier stage is determined and a new pump power for the second pump device is calculated depending on this. In this case, the new pump power is set at the beginning of a predetermined lead time before the arrival of the power jump at the input of the second amplifier stage. One disadvantage of this solution is that the effect of the regulation commences prematurely, and that the gain deviations produced as a result, although they are very small, have a disadvantageous effect in an amplifier cascade. Moreover, the lead time is dependent on the ratio of the optical powers at the input and at the output of the amplifier stages and on the regulator setting. The regulating behavior can be optimized with difficulty under these preconditions.

SUMMARY OF THE INVENTION

The present invention provides an optical amplifier having a plurality of amplifier stages or groups and having a regulating behavior that is as optimal as possible, such that power transients in the output signal of the optical amplifier, in particular after an abrupt change in the input power, are reduced as far as possible. Furthermore, a corresponding method for regulating an optical amplifier is to be specified.

In one embodiment of the invention, improves the feedforward control of an optical amplifier, having at least two series-connected amplifier groups, by inserting an additional control chain between the regulating devices of the individual amplifier groups. The error that arises as a result of the inherent delays in the regulating device of the first amplifier group is compensated for. The control chain according to the invention receives the same input signal as the regulating device of the first amplifier group. It has a series circuit preferably containing a high-pass filter, a delay and signal-shaping unit and a feedforward units. The high-pass filter has a cut-off frequency approximately corresponding to the cut-off frequency of the first amplifier group. A control signal that simulates the temporal error of the actuating signal of the first group is formed in the delay and signal-shaping unit. In the delay and signal-shaping unit, the control signal is temporally superposed with a temporally delayed copy of the signal, the delay duration corresponding to that of the regulation of the first amplifier group. A correction signal for the actuating signal of the second regulating device with the appropriate amplitude is subsequently generated in the feedforward unit. The dynamic response of the control and regulation process is optimized in this way. An optimum setting of the pump power for the second amplifier group is advantageously achieved, which has the effect that transients are prevented at the output of the optical amplifier. Optimum setting of the pump power is taken here to mean that the abrupt change in the power of the optical signal and the correspondingly adapted pump power signal arrive at the same point in time at that location of the amplifier at which the pump signal is coupled into the transmission fiber. The dynamic response of the totality of the regulating devices is coordinated with said point in time by means of the control chain according to the invention.

BRIEF DESCRIPTION OF THE DRAWINGS

The invention will now be explained in more detail with reference to the figures:
In the figures:
FIG. 2 shows a block diagram of a regulatable optical amplifier with two amplifier groups and the control chain according to the invention.
FIG. 3 shows a comparison of the time profiles of the optical and electrical signals involved in the control and regulation process.

DETAILED DESCRIPTION OF THE INVENTION

Figure 1:
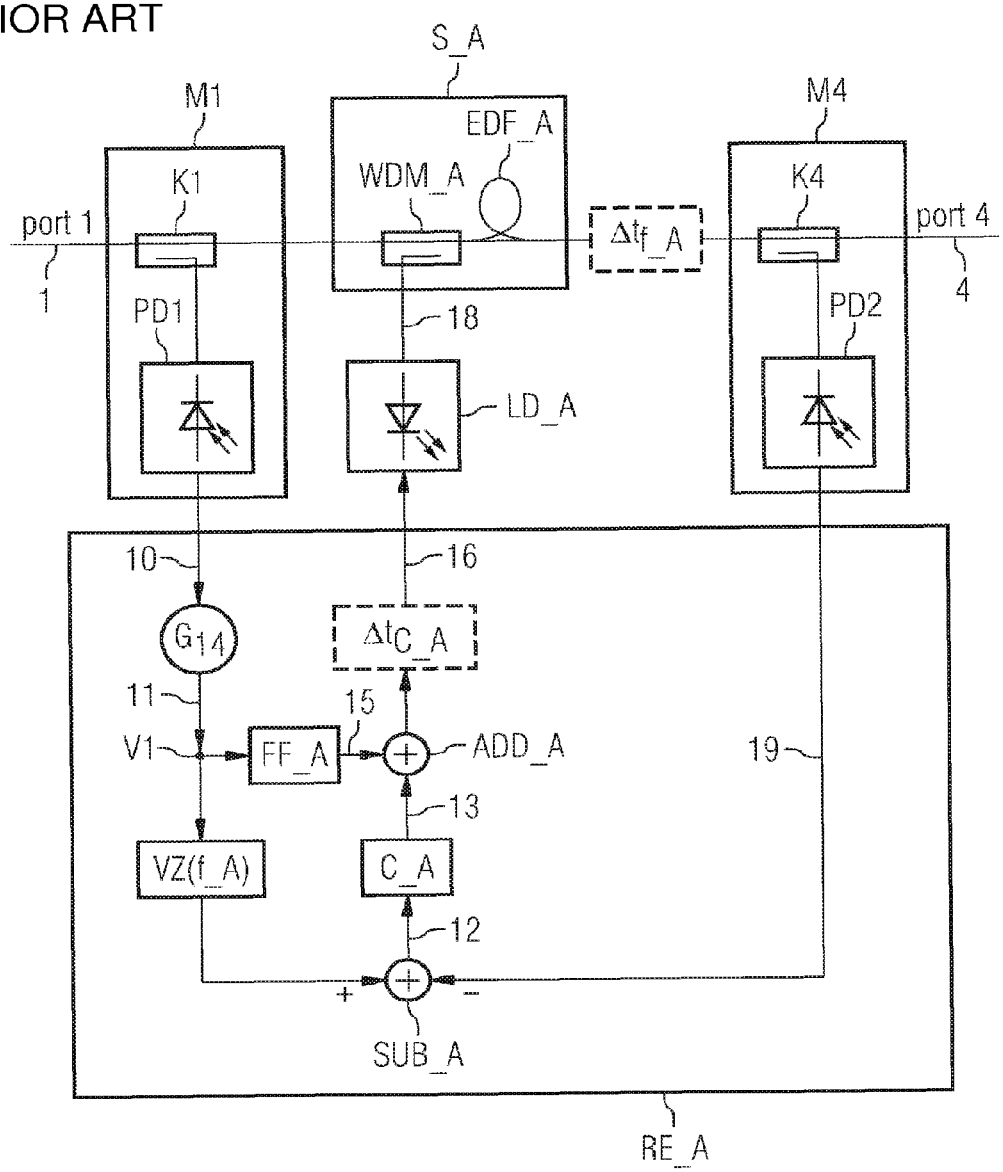
FIG. 1 shows a block diagram of an amplifier group with a connected regulating device.

Firstly the regulating device of an individual EDFA stage will be explained in more detail with reference to FIG. 1. A corresponding block diagram is indicated in FIG. 1. From the input port 1, an optical WDM signal 1 is fed to an amplifier stage S_A, the signal preferably having a wavelength range around 1550 nm. The amplifier stage S_A comprises an erbium-ion-doped amplifying fiber EDF_A and a wavelength-selective coupler WDM_A, via which a pump signal 15 from a pump source LD_A is fed to the amplifying fiber EDF_A. The pump source can be for example a laser diode having the emission wavelength of 980 nm or 1480 nm. A power monitor device M1 for the input signal is connected to the input of the amplifier stage S_A (port 1), the device comprising for example a coupler K1 with a monitor photodiode PD1 connected downstream. The photocurrent emitted at the electrical output of the power monitor device M1 is fed as electrical input signal 10 to the regulating device RE_A. A further power monitor device M4 for the output signal 4 is arranged upstream of the output port 4 of the overall arrangement. Said device likewise comprises a coupler K4 with a connected photodiode PD4. The power monitor device M4 serves for detecting the regulated variable (=output power). The photocurrent supplied by the monitor device M4 accordingly corresponds to the actual value of the regulated variable. The desired value of the regulated variable is generated with the aid of the power monitor device M1. The electrical input signal is firstly fed to a scaling unit $G_{14}$. This can be for example an electrical amplifier. The scaling unit $G_{14}$ has the function of simulating the gain of the EDFA stage. The gain is predetermined in this case. Consequently, a signal having a desired output power 11, to which regulation is to be effected, is present at the output of the scaling unit $G_{14}$. Said desired output power 11 serves, on the one hand, as desired value of the regulated variable and, on the other hand, as reference signal for the feedforward control unit FF_A. The signal 11 is therefore fed to a branching location V1, which is connected to the feedforward control unit FF_A, on the one hand, and to a first mixing location SUB_A, on the other hand. The first mixing location SUB_A has an input for the desired value of the output power 11 and an input for the actual value of the output power 19. In order that the two values are present at the mixing location at the same time, a delay element VZ(f_A) is inserted in the path of the desired value signal. In the delay element VZ(f_A), the desired value signal is delayed by the time period $\Delta t_{f\_A}$. Said time period corresponds to the delay experienced by the optical WDM signal upon passing through the EDFA stage with the associated conducting fibers. Said delay is identified as a block having the designation $\Delta t_{f\_A}$, with a dashed line in the signal path of the optical signal.

At the first mixing location SUB_A, the desired and actual values of the output power are compared with one another and the difference signal 12, also referred to as regulation deviation 12, is fed to the regulating or correction unit C_A. The latter calculates a positive or negative correction value for the manipulated variable depending on the regulation deviation 12. The manipulated variable or the actuating signal of the regulating unit is the pump current 16, which is linked approximately linearly with the output power of the pump source 18. In order to accelerate the regulating process and in order to be able to hold the desired gain value more precisely after a change in the input power, the regulation is supplemented by the feedforward control. In the feedforward control unit FF_A, the pump power for the pump source which is estimated to be necessary in order to maintain a constant gain is calculated on the basis of a predetermined model. The correction value 13 calculated by the regulating unit C_A is therefore modified at a further mixing location ADD_A by virtue of the estimated value 15 predetermined by the feedforward control unit FF_A being added to the signal 13. This value 16 for the manipulated variable resulting from the feedforward control and the regulating loop is then fed to the pump source LD_A. In order to indicate the delays that occur during the signal processing, a block having the designation $\Delta t_{C\_A}$ with a dashed line has been inserted at this location. Hereinafter it should always be taken into consideration that the blocks with a dashed line are not structural elements of the regulation device or other functional blocks, rather the blocks with a dashed line are only intended to highlight the time behavior of the signal respectively considered. On account of the identification of the signal delays by the box $\Delta t_{C\_A}$, it becomes clear that the pump signal 18 will always reach the EDFA in a delayed manner. Moreover, the box $\Delta t_{C\_A}$ is intended to illustrate in summary not only the signal delays in the electronic regulating device but also the delay that acts in the same way in the optical path and in the physical pump operation already described.

The delay $\Delta t_{C\_A}$ caused by the regulation device and amplifier group can be compensated for in a multistage amplifier by utilizing the propagation time of the optical signal in the course of propagation in a dispersion compensating fiber DCF arranged between two stages. These signal propagation time delays can be up to 100 μs and can be utilized during the signal processing of the electrical signals in the regulating device.

Under this assumption the control and regulation process is optimized by optimally adapting the propagation time of the electrical signals within the regulation system (or here within the regulating devices) to the propagation time of the optical signal in the transmission system. A signal analysis is carried out in order to improve the dynamic behavior within the regulating devices. Since an EDFA is a nonlinear system, only small signal disturbances at a defined operating point are considered, i.e. for a fixed gain value or a predetermined input and output power. In this case, the system can be linearized and linear systems theory is applicable. In this case of small signal analysis, therefore, only small changes in the input power are assumed below. These are achieved for example by modulating an electrical signal having a specific frequency onto the optical WDM signal. The electrical input signal impressed in this way can be composed of a sine function or of a plurality of such periodic functions having different frequencies. In this way it is possible to produce a step function such as would be present optically when channels are switched in or out. The response of a regulating block to the input signal (such as here the step function) is suitable for fully describing the time behavior of the regulating block as well as those of the entire regulating circuit, provided that linear behavior is ensured. The time function which describes the temporal profile of the signal at the output of a regulating block as a response to an abrupt change in the input signal is called step response or transition function. In the frequency domain, the Fourier transform of the temporal signal profile at the output of the system results from the product of the Fourier transform of the temporal signal profile at the input of the system and a transfer function of the system. If the frequency of the electrical input signal or, in the case of a plurality of frequencies, the spectrum of the input signal at the input of the spectrum is altered, then the time behavior of the regulation system can be checked by recording the electrical spectrum at the output of the EDFA or the regulating device. Conclusions about the magnitude and phase of the input signal can be drawn using a vector network analyzer.

If the transfer function of an EDFA is determined by means of the small signal analysis, then it is evident that the transfer function, for an input signal amplified at saturation in an EDFA, represents a high-pass filter. The cut-off frequency of the high-pass filter is proportional to the output power of the EDFA. If a variable optical attenuator (abbreviated to VOA) is inserted within an amplifier group comprising a plurality of EDFA stages, for example, then the cut-off frequency is increased by the attenuation factor. This means that the effect of an amplifier group on an abrupt input signal can be simulated by means of a high-pass filter. To put it more precisely, the high-pass filter simulates the system response of the pump path of the first amplifier group, which was modified by the conversion from the optical path to the pump path of the second amplifier group. This system response is similar to the frequency response of the optical path. If the delays which occur both in the optical path and in the regulating devices are furthermore balanced, then it is possible to achieve an ideal step-response function at the output of the optical amplifier. According to the invention, for this purpose an additional control chain is inserted between the regulating devices of a first amplifier group and a second amplifier group, said additional control chain preferably comprising a high-pass filter, a delay and signal-shaping unit and a scaling unit for the control signal. Details can be gathered from the exemplary embodiment below. Even without the high-pass filter, the introduction of the control chain already results in an improvement in the dynamic behavior, although a much more precise compliance with a constant gain is obtained with a precisely dimensioned high-pass filter.

FIG. 2 illustrates a block diagram of an optical amplifier comprising two amplifier groups G_A and G_B in this exemplary embodiment. The upper path contains the optical components and corresponds to the optical path of the optical WDM signal. The connected regulating devices contain the electronic functional units and paths. They can be realized either in analog or digital fashion, for example by means of a digital processor unit (abbreviated to DSP). The amplifier groups in this exemplary embodiment can be constructed from one or more amplifier stages according to FIG. 1. Furthermore, they can contain more than one pump laser diode as pump device, or else just one laser diode that pumps a plurality of amplifier stages. In this case, the functional block G_A or G_B is intended to contain, besides a number of erbium doped fibers, all the passive optical components such as couplers, isolators, VOAs and a pump device designed in any desired manner according to the prior art. A power monitor device M1 (likewise according to FIG. 1) is connected downstream of the input port 1 of the amplifier arrangement shown in FIG. 2, the WDM signal 1 being fed to the amplifier group G_A via the optical output of said power monitor device and the optoelectrically converted input signal 10 being fed to a first regulating device RE_A via the electrical output of said power monitor device. Arranged downstream of the amplifier group G_A is a further monitor device M4 for detecting the output power. The electrical output signal from M4 corresponds to the actual value of the regulated variable and is fed to the regulating device RE_A. The regulating device RE_A is constructed analogously to the regulating device described in FIG. 1 and supplies as actuating signal a pump current 14 for the pump device contained within the amplifier group G_A. The dashed box $\Delta t_{f\_A}$ is depicted for identifying delays of the optical signal which result through fiber leads within the amplifier group A. The dashed box $\Delta t_{C\_A}$ is indicated for identifying the inherent delays of the electrical signal within the regulating device RE_A and the delays in connection with the pump operation of the amplifier G_A. The time period $\Delta t_{C\_A}$ is also referred to as reaction time of the regulation RE_A.

The output-side monitor device M4 of the first amplifier group G_A can be followed for example by a dispersion compensating fiber DCF, which brings about a delay of the optical signal of $\Delta t_{DCF}$. In this exemplary embodiment, the second amplifier group G_B has only one output-side power monitor device M6. This amplifier group, too, can include as required a plurality of erbium fibers with one or a plurality of associated pump devices. The delays of the optical signal due to the erbium doped fiber and the fiber leads are indicated here by the dashed box $\Delta t_{f\_B}$. The pump power for the amplifier group G_B is adapted by means of the regulating device RE_B. The latter is designed in principle like the regulating device RE_A of the first group. The regulating device RE_B receives the input signal from the first monitor device M1 upstream of the first amplifier group G_A. Since the optical signal experiences the delays $\Delta t_{f\_A}+\Delta t_{DCF}$ in the upper path from port 1 to port 5, the electrical signals must also be adapted temporally in the regulating device RE_B in order to act at the same time as the optical signal.

The optoelectrically converted input signal 30 tapped off at the branching point V0 downstream of the monitor device M1 is firstly fed to the scaling unit $G_{16}$ of the regulating device RE_D, where it is multiplied by a gain factor corresponding to the entire optical path from port 1 to port 6 including the amplifier group G_B. The signal 31 scaled in this way is subsequently fed to the branching location V3. A first output of said branching location passes the signal 32 via a first delay element VZ1 to the feedforward control unit FF_B. In said delay element VZ1, the signal is delayed by the time period $\Delta t_{f\_A}+\Delta t_{DCF}-\Delta t_{C\_B}$. If, by way of example, further elements are added to this path, then the delay time in VZ1 should be correspondingly reduced by the delay of these elements. What is achieved in this way is that the control signal of the feedforward control unit FF_B is already generated before the reaction time of the second regulation $\Delta t_{C\_B}$. A second output of the branching location V3 leads via a second delay element VZ2 to the mixing location SUB_B of the regulating device RE_B, where the desired value 35 is compared with the actual value 39 and the regulation deviation 36 is output to the regulating unit C_B. In this case, the delay element VZ2 was set in such a way that the signal of the desired value 33 is delayed by a time period $\Delta t_{f\_A}+\Delta t_{DCF}+\Delta t_{f\_B}$ because the signal of the actual value 39 has also undergone precisely these delays and a simultaneous substation thus takes place. The regulating unit C_B is followed by an adder ADD_B, in which the control signal 34 of the feedforward control unit FF_B and the correction signal 37 generated in the regulating unit are added together.

In order to compensate for the reaction time of the first regulating device, the actuating signal 38 present at the output of the adder ADD_B is adapted both temporally and in terms of amplitude by means of a further correction signal 27. For this purpose, a further control chain SK is used, which uses as input signal the desired value signal 11 output by the scaling unit $G_{14}$. For this purpose, within the regulating device RE_A, in contrast to FIG. 1, a second branching point V2 is provided downstream of the first branching point V1, from which second branching point the input signal 11 previously scaled in $G_{14}$ is fed to the control chain SK according to the invention.

The electrical signal 20 is firstly fed to a high-pass filter HP. Through the filtering of the input signal by means of a high-pass filter having the same cut-off frequency as the amplifier group G_A, the feedforward signal is shaped in such a way that the optical output signal of group G_B has the same shape as if the input signal of group A were present at the input of group G_B. A feedforward control signal which generates no overshoots in the output signal can then be used within group G_B. In this exemplary embodiment, the high-pass filter HP is followed by a delay and signal-shaping unit DY. The latter can also be arranged upstream of the high-pass filter HP. Within said delay and signal-shaping unit, the signal firstly experiences a delay corresponding to the time period $\Delta t_{f\_A}+\Delta t_{DCF}-\Delta C_{\_B}$, that is to say that the electrical signal is delayed by the time required by the optical signal for passing through the amplifier group G_A and the DCF. The reaction time or inherent delay time of the amplifier group G_B is subtracted from this delay in order that the feedforward signal can be generated in a timely manner. The delay element VZSK is provided for setting the delay $\Delta t_{f\_A}+\Delta t_{DCF}-\Delta C_{\_B}$. The delay element VZSK is followed by a branching point V4, the first output of which is connected directly to an adder ADD, while the second output is connected to the adder via an interposed delay element VZ (C_A). In this way, a copy 24 of the electrical signal 23 is generated, the copy being delayed in VZ(C_A) by the reaction time or the inherent delay time $\Delta t_{C\_A}$ of the regulating device RE_A of the first amplifier group V_A. The undelayed signal 23 and the delayed signal 25 are added together in the adder ADD, with the result that a signal pulse of the time period $\Delta t_{C\_A}$ is present at the output of the delay and signal-shaping unit DY. If the transfer functions at the output of the blocks HP and DY are considered, then the transfer function at the output of the high-pass filter represents a simulation of the amplifier group G_A, while the transfer function at the output of the delay and signal-shaping unit DY represents the error generated by the inherent delay of the amplifier group G_A. A correction signal is then generated in the feedforward control unit FF2 connected to DY, the correlation signal compensating for the error of group G_A. The correction signal 27 thus represents an additional feedforward control signal and is added to the actuating signal 38 of the conventional regulating device of group G_B in a mixing location ADD_FF. The resulting actuating signal 40, which is provided for setting the pump power in amplifier group V_B, is set temporally such that the inherent delay of the regulating device of amplifier group V_B, which is indicated by the dashed box $\Delta t_{C\_B}$ in the drawing, is no longer significant and has been compensated for. The dashed box $\Delta t_{C\_B}$ has been inserted at this point only in order to draw attention summarily to the delays occurring in RE_B and the pump device of G_B, but has no effect on the signal 40 at this point.

In order to illustrate the method of operation of the individual functional blocks of the control chain SK according to the invention, FIG. 3 indicates some time profiles of the electrical signal and of the optical signal at different locations within the regulating device and within the optical path of the amplifier arrangement. Curve K_1 represents the power of the optical WDM signal 1 at the input (port 1) of amplifier group V_A. This is a step function that is intended to represent the omission of channels. The power jump takes place at the instant t=0. Curve K_15 represents the output signal 15 of the feedforward control unit FF_A. The actuating signal at the output of the adder ADD_A would also look like K_15. Curve K_16 represents the effective actuating signal, or in other words the effect of the pump signal. It becomes clear on the basis of curve K_16 that the pump signal acts too late by the time period $\Delta t_{C\_A}$. On account of this reaction time $\Delta t_{C\_A}$ of the amplifier group G_A, overshoots or undershoots occur in the optical output power. Curve K_4 represents such an overshoot in the optical power at the output of group A (port 4). Curve K_21 shows the electrical signal 21 at the output of the high-pass filter. This is the step response of the regulating block HP.

The following sets of curves show the signal profiles at a delayed instant $t=\Delta t_{f\_A}+\Delta t_{DCF}$ in comparison with t=0. Thus the curve K_5 shows the profile of the optical signal 5 at the input of amplifier group G_B. The power jump in the optical signal power arrives at the amplifier group GB in a manner delayed by the propagation time $\Delta t_{f\_A}+\Delta t_{DCF}$ (=propagation time through amplifier group G_A+propagation time through DCF). The curve K_33 shows the electrical signal 33 at the output of the delay element VZ1 within the regulating device RE_B of the second amplifier group G_B. The effect of the feedforward control unit FF_B is indicated in curve profile K_34. The signal 34 would act in a manner delayed by the reaction time $\Delta t_{C\_B}$ if the control chain SK according to the invention were not inserted.

Within the control chain SK, the electrical signal does not undergo said reaction time $\Delta t_{C\_B}$. The signal propagation time of the electrical signal is only adapted to that of the optical signal at the beginning of the amplifier group G_B. For this purpose, it has to pass through the delay element VZSK. The electrical signal 21 at the output of VZSK is represented in the curve profile K_21. Furthermore, curve profile K_26 indicates the electrical signal 26 at the output of the delay and signal-shaping unit DY. A signal pulse having the length $\Delta t_{C\_A}$, has been produced by the superposition of the signal 23 with a copy 25 time-delayed by the reaction time $\Delta t_{C\_A}$, of RE_A. The signal 26 is fed to the feedforward control unit FF2, where the amplitude is adapted, and the control signal 27 is subsequently added to the regulating signal 38 in the adder ADD_FF. The output signal 40 of the regulating device RE_B is illustrated in the curve profile K_40. K_40 shows the effective effect of the control chain SK according to the invention. The associated pump signal that takes effect in the amplifier group G_B is the subject of curve profile K_PB. Curve profile K_PB arises as a result of the addition of K_40 with K_34. It should be noted that the time periods $\Delta t_{C\_A}$ and $\Delta t_{C\_B}$ are identical in this exemplary embodiment. The effect of the pump signal becomes clear on the basis of curve profile K_6. This concerns the output power of the optical signal 6 at the output port 6 of the amplifier group G_B. It becomes clear that during the reaction time interval $\Delta t_{C\_A}$, the pump power must first be abruptly decreased in order to reduce the amplifier gain and to counteract the overshoot, and the pump power must subsequently be increased again in order to raise the amplifier gain again. It becomes clear on the basis of the curve profiles K_5, K_PB and K_6 that the time behavior of the individual regulating blocks of the regulating device RE_B is optimally designed. An optimal feedforward control has been achieved for the entire amplifier arrangement.

A further advantage of the design of the feedforward control according to the invention is that the magnitude of the correction signal output by the feedforward control unit FF2 is independent of the operating point of the regulating devices RE_A or RE_B. The magnitude of the correction signal essentially depends on the scaling—effected in the component G14—of the input signal tapped off from the monitor device M1. The correction signal generated in FF2 is thus independent of the output power of the individual amplifier groups G_A and G_B.

Further possibilities for realization can be formed if the feedforward control of the amplifier group G_A is set to be weaker or stronger or is switched off entirely. The signal 25 would have to be attenuated by the corresponding factor by the VZ (C_A), or this delay element could be obviated if FF_A were not present.

What is claimed is:

1. A regulatable optical amplifier, comprising:
   at least two series-connected amplifier groups,
   in which each amplifier group respectively has a pump device and a regulating device connected to the pump device, the regulating device, in the event of a change in the input power, adapting the pump power in order to maintain a constant amplifier gain; and
   a power monitor device for detecting changes in the input power is connected upstream of a first amplifier group, the electrical output of the power monitor device being connected both to a first regulating device and to a second regulating device, wherein
   inserted between the first and the second regulating device is a control chain having a series circuit comprising
   a high-pass filter having a cut-off frequency which corresponds approximately to the cut-off frequency of the first amplifier group,
   a delay and signal-shaping unit, and
   a feedforward control unit for generating a correction signal for the second regulating device.

2. The regulatable optical amplifier as claimed in claim 1, wherein the delay and signal-shaping unit comprises a series circuit composed of a delay element and a differential element, the differential element comprising an input-side branching element for splitting the input signal into two identical partial signals, a further delay element, which is arranged on one of the partial paths, and an output-side adder for combining the delayed and the undelayed partial signal.

3. The regulatable optical amplifier as claimed in claim 1, wherein each of the regulating devices of the amplifier groups has on an input side a scaling unit followed by a first branching location, in that a first output connected to a control unit and a second output leads to a first input of a first mixing location,
a second input of the first mixing location is connected to an output-side power monitor device of the respective amplifier group,
an output of the first mixing location is connected to a regulating unit, the output of which leads to a first input of a second mixing location, and
a second input of the second mixing location is connected to the control unit and the output of the second mixing location is connected to the pump device of the respective amplifier group.

4. The regulatable optical amplifier as claimed in claim 3, wherein the regulating device of the first amplifier group is configured such that there is arranged downstream of the first branching location a second branching location, the first output of which is connected to the first mixing location and the second output of which is connected to the control chain.

5. The regulatable optical amplifier as claimed in claim 3, wherein the regulating device of the second amplifier group is configured such that a first delay element is connected upstream of the control unit and a second delay element is connected upstream of the first mixing location, the delays obtained in the delay elements being different.

6. The regulatable optical amplifier as claimed claim 1, wherein the delay and signal-shaping unit of the control chain comprises only a delay element.

7. The regulatable optical amplifier as claimed in claim 1, wherein each amplifier group comprises at least one amplifier stage.

8. The regulatable optical amplifier as claimed in claim 1, wherein at least one dispersion compensating fiber is arranged between the amplifier groups.

9. A method for regulating an optical amplifier, comprising:
providing at least two series-connected amplifier groups, the gain of the optical amplifier being regulated by regulating devices; and
adapting a pump power fed to each amplifier group to maintain a constant amplifier gain, by determining a change in the input power of the first amplifier group and, in the event of a change in the input power, wherein part of the input power is tapped off and fed to the regulating devices of the amplifier groups, and is used after scaling for feedforward control and for setting a desired value of the output power of the respective amplifier group, the scaled control signal for the first regulating device is fed to a high-pass filter, the transfer function of which corresponds to that of the first amplifier group without taking account of delays, a signal pulse is generated from the control signal shaped by means of the high-pass filter, by means of a delay and signal-shaping unit, and the signal pulse is adapted in terms of amplitude to the pump power required for the second amplifier group and is subsequently used as a correction signal for the regulating device of the second amplifier group.

10. The method as claimed in claim 9,
wherein the time duration of the signal pulse corresponds to a reaction time of the first regulating device.

11. The method as claimed in claim 9,
wherein the scaled control signal for the second regulating device is split and both partial signals are temporally delayed, the delay time for the control signal comprising the sum of the delay time of the optical signal within the first amplifier group plus the delay time of the optical signal within a dispersion compensating fiber arranged between the first and second amplifier groups minus the reaction time of the second regulating device, and the delay time for the desired value comprising the sum of the delay times of the optical signal within the first and second amplifier groups plus the delay time of the optical signal within a dispersion compensating fiber arranged between the first and second amplifier groups.

* * * * *